US008886484B2

(12) United States Patent
Pillukat

(10) Patent No.: US 8,886,484 B2
(45) Date of Patent: *Nov. 11, 2014

(54) METHOD AND APPARATUS FOR THE CORRECTED RADIOMETRIC MEASUREMENT OF OBJECT POINTS ON SURFACES OF ASTRONOMICAL BODIES

(75) Inventor: Alexander Pillukat, Jena (DE)

(73) Assignee: Jena-Optronik GmbH, Jena (DE)

( * ) Notice: Subject to any disclaimer, the term of this patent is extended or adjusted under 35 U.S.C. 154(b) by 379 days.

This patent is subject to a terminal disclaimer.

(21) Appl. No.: 13/208,552

(22) Filed: Aug. 12, 2011

(65) Prior Publication Data

US 2012/0041705 A1 Feb. 16, 2012

(30) Foreign Application Priority Data

Aug. 12, 2010 (DE) .......................... 10 2010 034 318

(51) Int. Cl.
*G06F 19/00* (2011.01)
*G01C 11/02* (2006.01)
*H04N 5/341* (2011.01)
*H04N 3/08* (2006.01)

(52) U.S. Cl.
CPC .............. *H04N 5/341* (2013.01); *G01C 11/025* (2013.01); *H04N 3/08* (2013.01)
USPC ........... 702/104; 348/143; 348/144; 348/145; 382/254; 382/275

(58) Field of Classification Search
USPC .................. 348/145, 147, 143, 144; 702/104; 382/254, 275
See application file for complete search history.

(56) References Cited

U.S. PATENT DOCUMENTS

| 5,028,998 A * | 7/1991 | Westell .......................... 348/145 |
| 5,481,479 A * | 1/1996 | Wight et al. ................... 701/466 |

(Continued)

FOREIGN PATENT DOCUMENTS

| DE | 35 17 671 C2 | 3/1991 |
| DE | 103 54 752 A1 | 8/2004 |

(Continued)

OTHER PUBLICATIONS

Chen et al., "Development and Calibration of the Airborne Three-Line Scanner (TLS) Imaging System" Photogrammetric Engineering & Remote Sensing vol. 69, No. 1, Jan. 2003, pp. 71-78.*

(Continued)

*Primary Examiner* — Andrew Schechter
*Assistant Examiner* — John Kuan
(74) *Attorney, Agent, or Firm* — Duane Morris LLP

(57) ABSTRACT

A method and an apparatus for air-borne or space-borne radiometric measurement of object points present in an object scene on the surface of a astronomical body. A corrected recording of image points in an image plane in which object points from the object scene are imaged on a detector, is carried out by determining recording errors of the detector caused by systematically occurring spatial and temporal changes in a scanning movement of the detector, with reference to a measurement line relative to a recording field, then generally an actuation function along the measurement line in the form of different trigger times in which measurements of the individual object points are initiated exactly at that time. Based on the triggering of the detector elements due to the actuation function synchronized measurements of all of the object points of every row of an object matrix are carrying out along the designated measurement line.

16 Claims, 7 Drawing Sheets

(56) References Cited

U.S. PATENT DOCUMENTS

| | | | |
|---|---|---|---|
| 5,811,808 A * | 9/1998 | Cannata et al. | 250/332 |
| 7,778,534 B2 * | 8/2010 | Won et al. | 396/7 |
| 7,796,153 B1 * | 9/2010 | Sanderson et al. | 348/145 |
| 2007/0096772 A1 * | 5/2007 | Flynn | 327/91 |
| 2008/0031528 A1 * | 2/2008 | Crombez et al. | 382/232 |
| 2009/0299674 A1 | 12/2009 | Williams et al. | |
| 2010/0245571 A1 * | 9/2010 | DeVoe | 348/145 |

FOREIGN PATENT DOCUMENTS

| | | |
|---|---|---|
| DE | 10 2008 030 727 A1 | 12/2009 |
| WO | WO 2007/130871 A2 | 11/2007 |

OTHER PUBLICATIONS

Kornus et al., "The Evaluation of MEOSS Airborne Three-Line Scanner Imagery: Processing Chain and Results" Photogrammetric Engineering & Remote Sensing, VOl. 6.2, No. 3, Mar. 1996, pp. 293-299.*

Reulke et al., "Determination and improvement of spatial resolution of the CCD-line-scanner system ADS40" ISPRS Journal of Photogrammetry & Remote Sensing 60 (2006) 81-90.*

Gruen et al., "Sensor Modeling for Aerial Mobile Mapping with Three-Line-Scanner (TLS) Imagery" ISPRS Commission II Symposium, Integrated System for Spatial Data Production, Custodian and Decision Support, Aug. 20-23, 2002. Xian, China.*

* cited by examiner ively minor compared to imaging errors caused by surface curvature, but they still have a very detrimental influence on the achievable quality (precise pixel-to-pixel co-registration) of the measurements.

METHOD AND APPARATUS FOR THE CORRECTED RADIOMETRIC MEASUREMENT OF OBJECT POINTS ON SURFACES OF ASTRONOMICAL BODIES

RELATED APPLICATIONS

The present application claims priority benefit of German Application No. DE 10 2010 034 318.8 filed on Aug. 12, 2010, the contents of which are incorporated herein by reference in their entirety.

FIELD OF THE INVENTION

The invention is directed to a method and an apparatus for airborne radiometric measurement of object points present in an object scene on the surface of an astronomical body which are assigned to rows and columns of an object matrix during a scanning progressing systematically in a first scanning direction and a second scanning direction, wherein the object matrix points are imaged on a detector in an image plane generated by optics, and the image inside the image plane is recorded by at least one radiation-sensitive detector element of the detector.

BACKGROUND OF THE INVENTION

In the radiometric measurement of object points on the surface of an astronomical body conducted from platforms such as aircraft, spacecraft or satellites, the problem regularly posed is that of how to correct distortion in the image points imaging the object points which is caused, for example, by the structure and shape of the surface.

Of the many technical solutions for correcting distortion of the type mentioned above, only two will be mentioned here by way of example. WO 2007/130871 A2 discloses an optical adapter for use during satellite-based image acquisition by which distortion in an acquired image can be corrected subsequently and a distortion-free final image can be provided.

A correction of distortion based on the use of reference images is disclosed in DE 103 54 752 A1, wherein a mapping function is derived from a quantity of ground control points and is used for the correction. An approach of this kind, which aims at a posterior correction of image points, is commonly applied. The information content of individual, punctiform image points is modified, e.g., averaged or converted. Renderings of the object point which are largely free of distortion can be achieved by means of corrections carried out subsequent to recording, but the "identity" of an object point, i.e., its qualitative characteristics which are actually measured, is lost.

The effect of imaging errors is especially detrimental when defined object points are measured successively in time by a plurality of detectors, e.g., linear-array detectors or area-array detectors, for what is known as co-registration. Imaging errors of this kind can be superposed one upon the other, particularly when measuring in equidistant time steps.

Therefore, DE 10 2008 030 727 A1 describes a method by which imaging errors occurring during the observation of astronomical bodies by satellite-based instruments are minimized already during image acquisition. The imaging errors are caused by the surface curvature and rotational movement of the astronomical body and/or the flight motion of the observing instrument. Minimization is carried out by means of sensor pixels of different sizes and by different combinations of a plurality of detector elements varied over time. In addition, the above-mentioned methods can be applied for reducing imaging errors.

Aside from the imaging errors mentioned above, errors can occur during the recording of image points which is needed for a measurement due to an insufficiently precise relationship between detector elements of a detector and the image points to be measured because of the arrangement and size of the detector elements or because of a movement of the detector at a recording time (recording errors). In this case, those spatial regions over which a detector element can acquire information in an image plane (recording field) do not overlap sufficiently with an image point of an object point to be measured at the recording time. Aside from random and spontaneous recording errors, an important group of recording errors are those which occur in a predictable manner and magnitude (systematically).

A previously known high-performance camera HRSC (High Resolution Stereo Camera) described by R. Jaumann et al., DLR Nachrichten 116, 2006, 20-27, has been used in the Mars Express probe since 2004 for three-dimensional surveying of the surface of Mars. For this purpose, a probe orbits Mars and measures characteristics of object points by means of a measuring head having nine CCD lines, of which five are used for stereo recordings and photometric recordings and the other four for recording in different spectral regions. The detectors are arranged transverse to the flight direction and parallel to one another in the image plane of an objective. Therefore, each row records the object points with a time offset. Each detector line has approximately 5200 pixels (detector elements) by which an object point is measured in each instance. This high-performance camera carries out very high-precision geometric and radiometric measurements. In so doing, however, it is not evident that every object point on the surface of the astronomical body is correctly associated spatially and temporally by the corresponding detector elements of each of the nine detector lines for the subsequent superposition of the matching pixel data (co-registration). However, the correct temporal and spatial superposition of the matching pixel data cannot be ensured for all pixels because of recording errors resulting from the differing position of the detectors in the image plane of the objective.

Recording errors which are caused by systematically occurring spatial and temporal changes in a scanning movement of the detector, i.e., which depend substantially upon the design layout of the recording technical system, are relat## OBJECTS OF THE INVENTION It is the object of the invention to find a possibility for aircraft-based and satellite-based radiometric measurement of object points on the surface of an astronomical body by which recording, errors caused by systematically occurring spatial and temporal changes in a scanning movement of the detector are minimized and the identities of the measurements of the object points are preserved.

In a method for airborne corrected radiometric measurement of object points present in an object scene on the surface of an astronomical body which are assigned to rows and columns of an object matrix during a scanning progressing systematically in a first scanning direction and a second scanning direction, wherein the object points are imaged in an image plane on a detector as image points, and the image points inside the image plane are recorded by at least one radiation-sensitive detector element of the detector, wherein a recording field is acquired by the detector element at every recording time, the above-stated object is met in that, prior to the start of the measuring process, recording errors of the detector caused by systematically occurring spatial and temporal changes in a scanning movement of the detector are determined, with reference to points on a measurement line along which the image points are recorded, as relative positional deviations of the recording field from the points of the measurement line, in that an actuation function is generated based on the relative positional deviations along the measurement line in the form of trigger times in which measurements of the individual object points are initiated at different times, wherein the trigger times are so defined along the measurement line that the measurement of every object point is carried out when the image point thereof corresponds spatially to a recording field of a detector element assigned to the measurement line, and the actuation function is stored and made accessible to a detector control of the detector for successive measurements along the measurement line so that synchronized measurements of all object points of every row of the object matrix are carried out along the measurement line.

Within the meaning of the invention, recording errors caused by systematically occurring spatial and temporal changes in a scanning movement of the detector are errors in the recording of the image points which are caused by the construction and sequence of movements of the detector used for measurement. Changes of this kind can be, for example, systematically occurring acceleration phases and deceleration phases of a scanner which scans line by line or of a mirror scanner whose axis of rotation does not lie in the mirror plane. By systematically occurring changes in a scanning movement of the detector is meant herein those changes whose spatial and/or temporal course along a measurement line is dependent upon design and which are generally known in theory.

The actual character of the recording errors can be determined theoretically as well as empirically by means of a suitable test setup.

Recording errors result in relative positional deviations of the recording field of a detector along the measurement line and with respect to points of the measurement line. A point of the measurement line is uniquely assigned to every image point.

The use of the concepts of first scanning direction and second scanning direction does not imply that image points are recorded exclusively in succession. A plurality of image points can also be recorded simultaneously or in a desired sequence.

A positional relationship between image plane and detector in which, in the absence of recording errors, all image points and all recording fields would be aligned exactly along the measurement line is preferably used as a starting point for determining the relative positional deviations.

The first scanning direction can be the direction of a flight movement. The movement of a detector element, e.g., a scanner, in a scanning direction other than the first scanning direction, for example, transverse to the first scanning direction, can be defined as a second scanning direction.

The measurement line is advantageously defined in the image plane along the first scanning direction or second scanning direction. However, it can also comprise combinations of the first scanning direction and second scanning direction. Its shape is preferably linear, but can also be, e.g., curved or angled, and continuous or discontinuous.

Relative positional deviations are acquired with reference to a determined measurement line for each of those recording fields which would be imaged at least occasionally on the measurement line in the absence of recording errors.

The relative positional deviations of the recording fields are acquired with regard to two parameters: first, for each recording field, the distance and position thereof from the position of the image point to be recorded on the measurement line is determined and stored; second, it is determined whether the recording field under consideration has already passed (lies ahead of or leads) the measurement line, whether it lies on the measurement line, or whether it has not yet reached (lags behind) the measurement line. The relative positional deviations are acquired as a pair of values of precisely this specific spatial positional relationship of the image point and recording field. Another position of the image point and recording field, e.g., when another row of the image plane is acquired, results in another data set of relative positional deviations which is specific to the row. In further embodiments of the method according to the invention, leading and lagging can also be determined with respect to points of the measurement line. This is important when relative positional deviations occur along the measurement line.

The acquired relative positional deviations are preferably uniquely assigned in each instance to a point of the measurement line along the length of the measurement line. An assignment of this kind results in a discrete assignment which can be converted by interpolation into a—preferably continuous—actuation function.

It is also possible to express the discrete assignment of recording fields to points of the measurement line as a discontinuous error function. This can then be converted into a continuous error function by known mathematical rules. A continuous error function can advantageously serve as the basis for a far greater number of possible actuation functions than a discontinuous error function.

The relative positional deviation need not be acquired for every recording field. A smaller quantity of recording fields can be sufficient for generating a discrete assignment particularly when relative positional deviations change uniformly one after the other and in case of a symmetrical distribution of these relative positional deviations along the measurement line. For example, the relative positional deviations of only of every third recording field or—with symmetrically occurring deviations—of one value per pair of symmetrically deviating recording fields can be acquired.

The recording fields can move along the measurement line and past it due to the scanning movement in at least one of the above-mentioned scanning directions. In so doing, the positional relationship of the measurement line to the image plane remains constant.

Further, the measurement line can occupy different positions in the image plane during different measuring processes. There may also be a plurality of measurement lines. For every position of the measurement line within the image plane, a discrete assignment of the relative positional deviations proper to this position can be acquired and an actuation function proper to this position can be generated.

The actuation function is generated in that, for every image point, the deviation in time of the coincidence of the recording field with the measurement line selected as reference or with the point of the measurement line selected as reference, which deviation corresponds to the relative positional deviation, is determined as a function value of the actuation function. In so doing, leading or lagging of the respective recording fields is entered in the actuation function. The actuation function can be generated as a continuous function and as a discontinuous function.

A correction of recording errors which are caused by spatial and temporal changes in a scanning movement of the detector can be carried out by means of the method according to the invention in the first scanning direction and in the second scanning direction as well as in a combination of both scanning directions.

Further, it is possible that systemic imaging errors are also taken into account by the actuation function in addition to the recording errors caused by systematically occurring spatial and temporal changes of a scanning movement of the detector. Systemic imaging errors are caused by the shape, size and design of the optics used for measurement (e.g., distorted position of image points in the image plane).

In other advantageous embodiments of the method, additional, spontaneously occurring imaging errors which are not caused by systematically occurring spatial and temporal changes in a scanning movement of the detector can be entered in the actuation function.

Spontaneously occurring recording errors can be caused, for example, by varying unpredictable (random) changes in positional relationships of the detector to the image plane (e.g., vibrations) which can originate, for example, in the movement of a unit (e.g., an aircraft) carrying the optics. Accordingly, a dynamic correction of radiometric measurements by means of a progressive adaptation of the actuation function is also possible during implementation of the method according to the invention.

Acquisition of this kind can be carried out, for example, by suitable measuring means such as position sensors.

Measurements along the measurement line can be triggered separately in time for every object point along the measurement line. For this purpose, a detector element can be guided along the measurement line over the image points of the object points or an arrangement (array) of detector elements can be triggered.

An advantageous and efficient embodiment of the method according to the invention consists in that groups of selected image points are formed whose respective recording fields have relative positional deviations which are less than a predetermined threshold, and the measurements of the object points of a group are triggered simultaneously.

Measurements of the respective groups can be triggered separately in time along the measurement line. Such groups of object points arranged in a defined manner can be object points which are arranged adjacent to one another along the measurement line or object points not adjacent to one another along the measurement line, these object points being determined in that the relative positional deviations of the image points of object points within a group differ from one another at most by a defined threshold value. Further, additional rules for forming groups are possible, and these rules can be configured dynamically, for example, so as to be adaptable to the actuation function.

In an embodiment of the method according to the invention, it is advantageous when the measurements of a plurality of non-contiguous object points or groups of object points are triggered simultaneously. Accordingly, when the relative positional deviations are distributed along the measurement line in a mirror-symmetric manner, it is advisable that measurements of object points or groups of object points which correspond to one another in a mirror-inverted manner be triggered simultaneously.

A radiometric measurement of object points or groups of object points is generally carried out over a determined spectral range. If a plurality of measurements of an object point are to be carried out in the same spectral range or in different spectral ranges, the object point can be measured a plurality of times successively (known as co-registration). In so doing, the actuation functions of the detectors used for co-registration are generated corresponding to the respective position of the measurement line within the image plane.

Measurements for the same object points can be triggered repeatedly successively in time for different measurement lines.

Measurements of the individual object points along a measurement line can be carried out simultaneously, sequentially, or in a selected sequence.

The method according to the invention can be applied for measurements of electromagnetic waves (e.g., light) as well as for particle radiation (e.g., nuclear radiation).

The method according to the invention can advantageously be used in an integrated circuit in which each detector element of the detectors is connected to a control by a signal line and every detector element can be triggered individually. Further, it can be used in an integrated circuit in which groups of detector elements of the detector are connected in each instance to the detector control via a signal line so that measurement of a plurality of object points can be triggered simultaneously within the groups.

Further, it can advantageously be used in an above-mentioned integrated circuit in which, in addition, at least one delay element is arranged on at least one signal line in order to retard a control signal sent from the detector control depending on the actuation function.

Of course, the method according to the invention can also be used to correct recording errors caused by incorrect positions of detector elements.

Further, in an apparatus for airborne corrected radiometric measurement of object points present in an object scene on the surface of an astronomical body which are assigned to rows and columns of an object matrix during a systematically progressing scanning, having optics by which the object points are imaged on a detector arranged in an image plane, wherein intensities of the imaged object points can be recorded as image points inside the image plane by a detector having at least one radiation-sensitive detector element for generating a systematically progressing imaging of the object matrix in image points, wherein a recording field is acquired by the detector element at every recording time, the above-stated object is met in that a storage is provided for storing an actuation function, wherein the actuation function is generated based on recording errors caused by systematically occurring spatial and temporal changes in a scanning movement of the detector, and the recording errors are determined as relative positional deviations of the recording fields with respect to points on a measurement line; the storage is connected to a detector control in order to generate control signals for the detector at trigger times from the stored actuation function in the detector control, wherein the trigger times along the measurement line are defined in such a way that measurement of every object point is carried out when the image point thereof in the image plane spatially corresponds to the recording field of a detector element assigned to the measurement line; and in that the detector is connected to the detector control in order to actuate each detector element for the recording of a respective image point at the correspondingly defined trigger time.

Depending on the radiation to be acquired, the optics can comprise lenses and beam-deflecting elements, e.g., of glass, plastic or other known materials or composites. Lenses and beam-deflecting elements of the optics can also be designed as magnetic lenses and/or electrostatic beam-deflecting elements. Further, the detector can also be suitable for detection of particle radiation as well as for detection of electromagnetic radiation. Depending upon the embodiment, the apparatus according to the invention can be used for radiometric measurements of electromagnetic radiation and particle radiation (e.g., nuclear radiation).

The detector can comprise one or more detector elements. It can be a line detector or a detector matrix having detector elements arranged in rows and columns. Further, the detector can be, for example, a pushbroom scanner or a whiskbroom scanner, as they are called.

The detector lines or the rows of a detector matrix are preferably oriented orthogonal to the first scanning direction. In other advantageous embodiments of the invention, the detector elements can also be arranged in the first scanning direction.

Further, it is possible to arrange detector elements so as to be offset individually or in groups relative to one another, e.g., in a stepped manner. Accordingly, it is also possible to use and arrange large detector elements in an advantageous manner. The detector elements which are offset relative to one another advantageously lie on a plurality of measurement lines which are parallel to one another.

The actuation of the detector can be configured in a variety of ways. Each detector element can be connected to the detector control by a separate signal line so that each detector element can be triggered individually.

Further, it is possible that groups of detector elements of the detector are connected respectively to the detector control via a signal line, respectively, so that measurement of a plurality of object points can be triggered simultaneously within the groups.

Also, the apparatus according to the invention can be constructed in such a way that at least one delay element is arranged on at least one signal line in order to retard a control signal sent from the detector control depending on the actuation function.

The at least one delay element can be adjusted for a determined delay. This adjustment can be carried out before, during, or after the installation of the delay element. The adjustment of the delay of the delay element can be carried out as setting a fixed value for the delay. In further embodiments, the at least one delay element can also be programmable so that the programmable delay can be adjusted in a fixed manner and can also be dynamically adapted during operation of the apparatus. The latter embodiment is advantageous particularly when spontaneously occurring contributions to the relative positional deviations of the recording fields must be taken into account.

Further, it is possible that the detector is connected to the detector control via a signal bus and has addressable detector elements which can be triggered individually or in groups by means of addressed signals. A system of addressable detector elements and addressed signals of this kind can be realized, for example, by a serial bus system such as is known from control engineering. The advantages of a construction of this kind include the small quantity of required signal lines and the capability of a flexible and dynamic triggering of individual detector elements or groups of detector elements.

The possible embodiments of the apparatus according to the invention mentioned above can also be realized as integrated circuits (chips).

An actuation function can be generated, for example, by an analog generator, a digital generator, or a digital table.

BRIEF DESCRIPTION OF THE DRAWINGS

The invention will be described more fully in the following with reference to embodiment examples and drawings. The drawings show.

DESCRIPTION OF THE EMBODIMENTS

Figure 1:
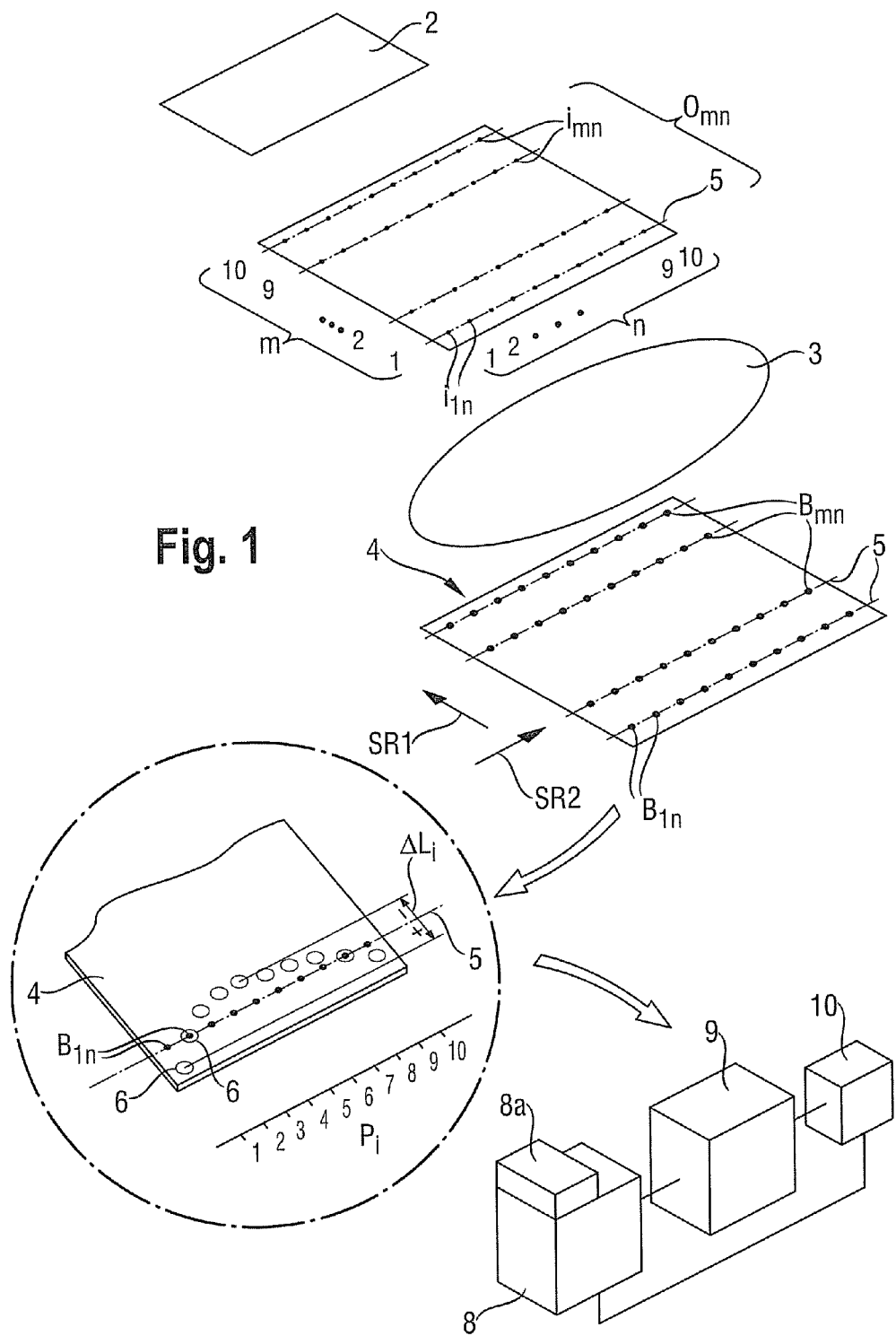
FIG. 1 the principle of the invention shown in a schematic overview illustrating how imaging is carried out.

According to FIG. 1, the essential elements in a first embodiment of the apparatus according to the invention comprise optics 3 by which object points $i_{mn}$ of an object 1 which is located on the surface of an astronomical body and in an object scene 2 are assigned to rows m and columns n of an object matrix $O_{mn}$ and imaged in an image plane 4 as image points $B_{mn}$ during a scanning progressing in a first scanning direction SR1. A detector 8 is provided which is constructed as a whiskbroom scanner by means of which image points $B_{mn}$ in the image plane 4 can be recorded within a recording field along a linear measurement line 5. Each measurement is carried out at a determined point $P_i$ of the measurement line 5 so that a recording field 6 is assigned to each point $P_i$. The detector 8 communicates with a detector control 9 and a storage 10. The detector 8 has a detector element 8a which is guided in a second scanning direction SR2 along the measurement line 5, which is parallel to rows m, and records the image points $B_{mn}$. The detector element 8a is guided in the first scanning direction SR1 successively over the individual rows m.

In other embodiments of the invention, the detector 8 can be a scanner rotating around an axis such as a Schiefspiegler telescope having half-angle mirrors of finite thickness or a pushbroom scanner, as it is called. Different quantities of detector elements can be provided which, further, can scan different rows m.

For the sake of clarity, the image points $B_{mn}$ are shown by way of example in FIG. 1 in ten rows m (m=1 ... 10) and ten columns n (n=1 ... 10) of the object matrix $O_{mn}$. Linearly shaped measurement lines 5 are arranged so as to extend parallel to the rows m of the object matrix $O_{mn}$ and in the direction of the second scanning direction SR2. In this instance, the image points $B_{mn}$ are imaged in the image plane 4 exactly along the measurement lines 5 without distortion and coincide in each instance with a point $P_i$.

At the time shown in the drawing, the measurement line 5 shown farthest to the right is adjusted in such a way that, in the absence of recording errors, all of the recording fields 6 of the first row m (m=1) coincide spatially in each instance with a point $P_i$ of the measurement line 5.

Actually, however, the recording fields 6 along the measurement line 5 in the image plane 4 have relative positional deviations $\Delta L_i$ with respect to the points $P_i$ which are associated with the recording fields.

These relative positional deviations $\Delta L_i$ arise from spatial and temporal change in the scanning movement of the detector 8.

Figure 2A:
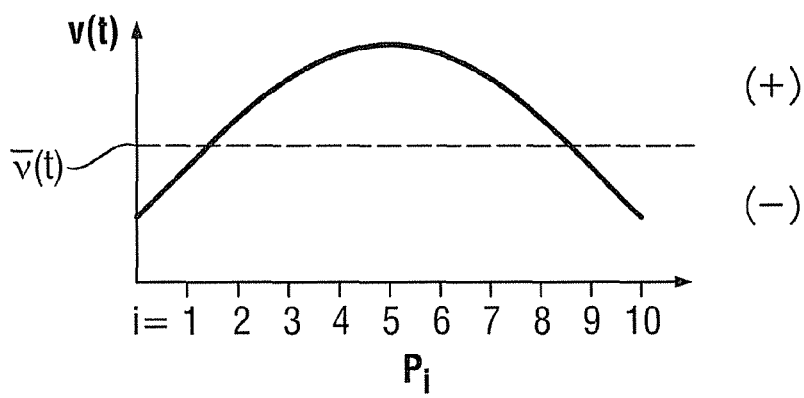
FIG. 2 a schematic view of a) a systematically nonlinear temporal movement sequence of a scanner, and b) an actuation function of the trigger times which is necessary to compensate for the nonlinear scanning movement.

As is shown in FIG. 2a, the scanning movement of the detector 8 (not shown) undergoes a spatial and temporal change, in the present case, for example, in the form of a mirror-symmetric, parabolic curve of the movement speed v(t) which swings around a mean movement speed $\overline{v}(t)$. Such a change in the movement speed v(t) can be caused by an acceleration and deceleration of the scanner during the recording of image points $B_{mn}$ at the start and end of the measurement line 5.

The profile of the movement speed v(t) is dependent upon design and is therefore known in theory. The recording field 6 is guided along the measurement line 5 at movement speed v(t), and its concrete position on the measurement line 5 at a point in time is determined by the function of the real movement speed v(t).

The position of points $P_i$ along the measurement line 5 which is associated with a designated position of the recording field 6 at a determined time is known.

The difference between the real movement speed and the mean movement speed $\overline{v}(t)$ is acquired at the respective points $P_i$, converted into a time difference $\Delta t$, and stored.

In order to determine a real movement speed v(t) in practice also, the relative positional deviations $\Delta L_i$ are acquired by suitable measuring means and measuring methods as perpendicular distances of the individual recording fields 6 from the points $P_i$ of the measurement line 5 which are associated with them and are stored. This can be carried out in such a way, for example, that the actual profile of the movement speed v(t) of a scanner is measured by means of a high-precision clocked light source (not shown). The light source is imaged behind the scanning mechanism on the image plane 4 as a reference point. A CCD measuring camera is arranged in the image plane 4 and measures the position of the imaged reference point in the image plane 4 in a highly precise manner. The profile of the movement speed v(t) is determined from the deviation of a reference position and an actual position.

All of the relative positional deviations $\Delta L_i$ of recording fields 6 in which the recording fields 6 have already passed the corresponding points $P_i$, i.e., which lead point $P_i$, in the first scanning direction SR1 are indicated by a positive sign "+", while all of the relative positional deviations $\Delta L_i$ in which the recording field has not yet passed point $P_i$, i.e., lags behind point $P_i$, are indicated by a negative sign "−".

When a correction of radiometric measurements is carried out in the second scanning direction SR2 in another embodiment of the invention, the signs are allocated in a corresponding manner. If recording fields 6 lie alongside the measurement line 5 rather than on the measurement line 5, their relative positional deviations $\Delta L_i$ are determined in a corresponding manner. For this purpose, the rules of vector calculation can be used, particularly when corrections are carried out in the first scanning direction SR1 and second scanning direction SR2.

Figure 2B:
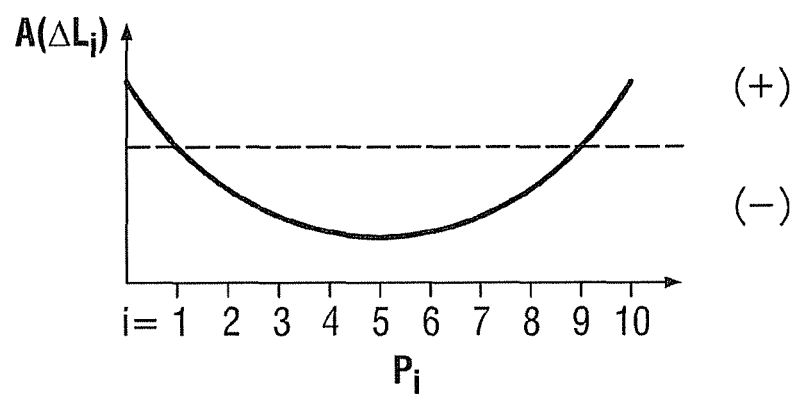

An actuation function $A(\Delta L_i)$ resulting from this change in the scanning movement is shown schematically in FIG. 2b.

Figure 3A:
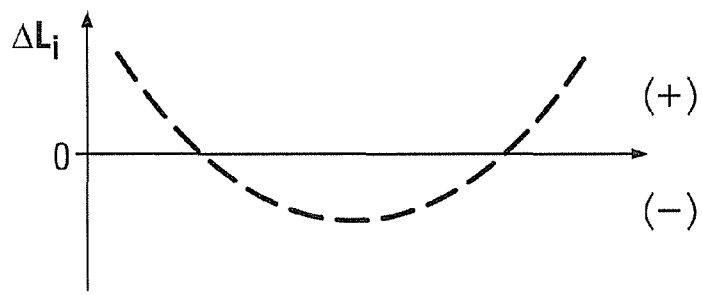
FIG. 3 a schematic graph showing a) the relative positional deviations along a measurement line, b) a generated discontinuous and continuous error function, and c) an actuation function generated from the error function.
Figure 3B:
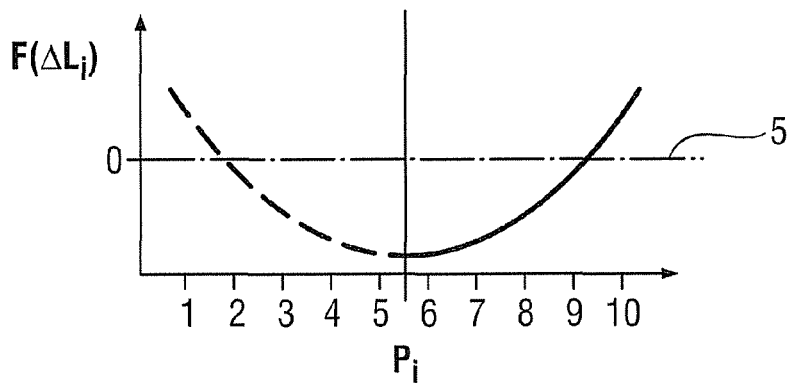
Figure 3C:
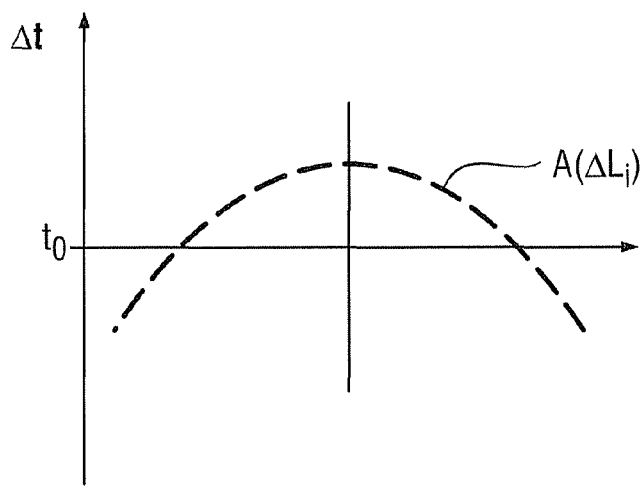

The relative positional deviations $\Delta L_i$ which are plotted along the measurement line 5 in FIG. 3a by way of example are uniquely assigned in each instance to a point $P_i$ of the measurement line 5 so that a discrete assignment (which can also be expressed as a discontinuous error function) of the relative positional deviations $\Delta L_i$ relative to points $P_i$ results along the measurement line 5 as is shown in the left-hand half of FIG. 3b. By interpolating the individual function values, the discrete assignment can (optionally) be converted to a continuous error function $F(\Delta L_i)$ as is shown in the right-hand half of FIG. 3b. In the present example, the error function $F(\Delta L_i)$ which is shown schematically has zero points ($\Delta L_i=0$) at x=2 and 9 and a vertex at x=5.5.

An actuation function $A(\Delta L_i)$ is now generated in that the relative positional deviations $\Delta L_i$ are converted into time differences $\Delta t$ using the known movement speed v(t) of the scanning movement in the second scanning direction SR2, but the sign is retained in each instance (leading recording fields 6 have positive signs, lagging recording fields 6 have negative signs). A time $t_0$ is defined as reference time for the respective point $P_i$. At this time $t_0$, the recording field 6 which is not subject to systematic recording errors (in this case, the second and ninth recording field 6) coincides with point $P_i$.

In further embodiments of the invention, the actuation function $A(\Delta L_i)$ can also be generated using the error function $F(\Delta L_i)$.

A time difference $\Delta t$ is assigned to every point $P_i$ of the measurement line 5. Leading recording fields 6 already coincide with point $P_i$ before time $t_0$, lagging recording fields 6 coincide with point $P_i$ later than time $t_0$. A trigger time is defined for each point $P_i$ of the measurement line 5 by subtracting the respective time difference $\Delta t$ of point $P_i$ from $t_0$. In this regard, time differences $\Delta t$ having a positive sign result in trigger times before time $t_0$, while time differences $\Delta t$ having negative signs result in trigger times after time $t_0$ as is shown in FIG. 2c. The actuation function $A(\Delta L_i)$ is accordingly generated as an assignment of trigger times to points $P_i$ of the measurement line 5.

Figure 4:
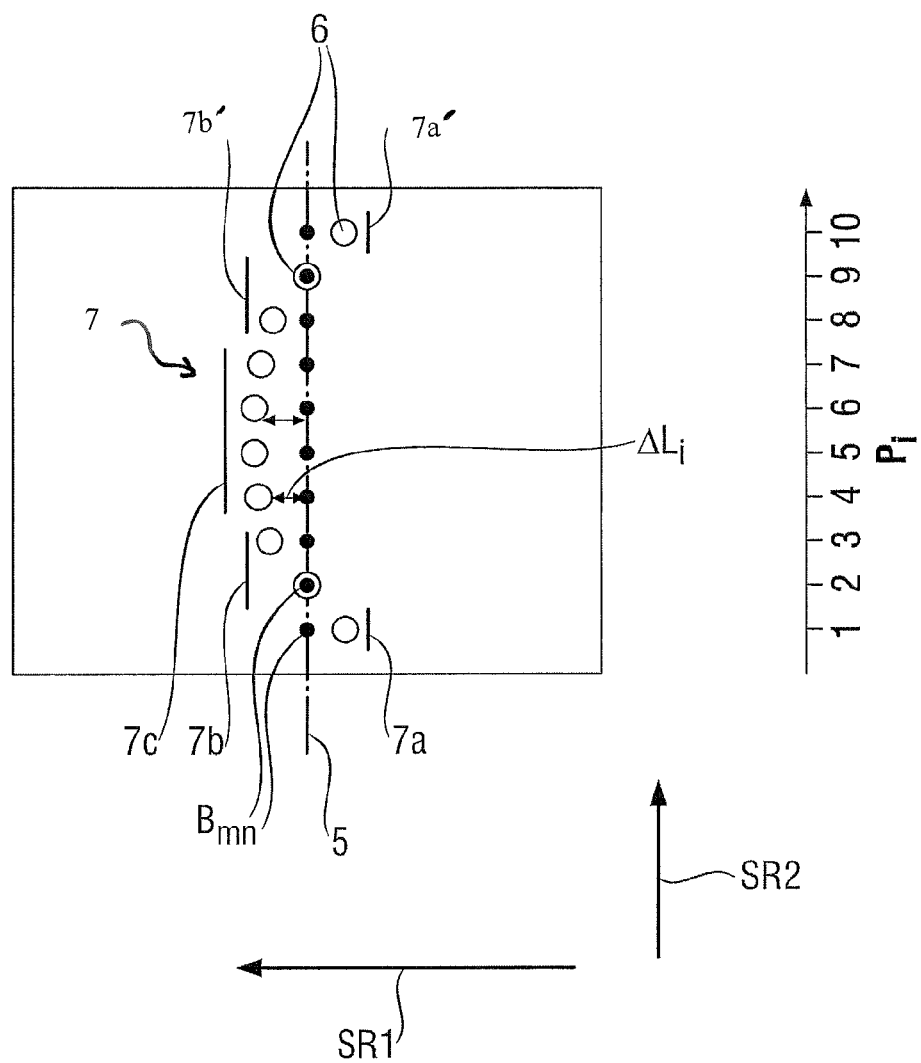
FIG. 4 a schematic graph showing image points and groups of image points.

In a modified embodiment of the method according to the invention which is shown in FIG. 4, groups 7 of image points $B_{mn}$ can be assembled in which the relative positional deviations $\Delta L_i$ of their recording fields 6 differ by no more than a designated threshold value.

To illustrate this situation, image points $B_{mn}$ are shown whose recording fields 6 have relative positional deviations $\Delta L_i$ which are arranged in a mirror-symmetric manner with respect to an orthogonal line extending through the center of the measurement line 5 and perpendicular to the respective points $P_i$ of the measurement line 5. With respect to amount and sign, the relative positional deviations $\Delta L_i$ of the recording fields 6 are identical at the points $P_i$ at i=1 and i=10 which do not lie adjacent. The differences of the relative positional deviations $\Delta L_i$ of the recording fields 6 at the respective adjacent points $P_i$ at i=2 and i=3 and at i=8 and i=9 do not exceed a determined threshold value (e.g., threshold value=1). The relative positional deviations $\Delta L_i$ of the recording fields 6 at points $P_i$ at i=4, 5, 6 and 7 where $\Delta L_i=0.5$ are likewise below the predetermined threshold value.

A time difference $\Delta t$ and a trigger time are assigned to the above-described groups 7 and are calculated based on a mean relative positional deviation $\Delta L_i$ of the respective group 7.

The generated actuation function $A(\Delta L_i)$ relates to the group 7a and 7a' of corresponding recording fields 6 of the points $P_i$ at i=1 and i=10, respectively, and the group 7b and 7b' of corresponding recording fields 6 of the points $P_i$ at i=2; 3 and i=8; 9, respectively, and to the group 7c comprising recording fields 6 of contiguous points $P_i$ at i=4; 5; 6; 7.

It is useful to determine the groups 7 based on the time differences $\Delta t$ or resulting trigger times.

Figure 5A:
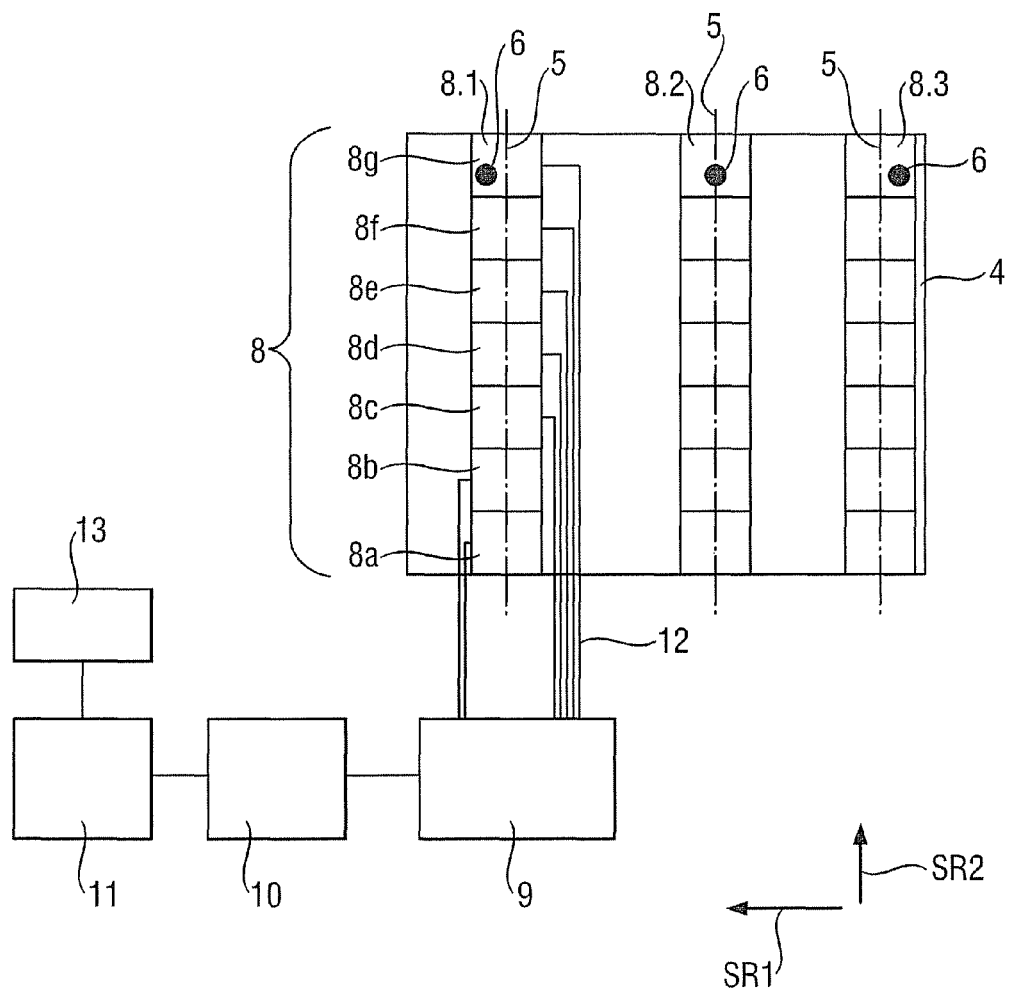
FIG. 5 a schematic representation of a) an embodiment of the apparatus according to the invention having separate signal lines for individual detector elements or groups of detector elements, b) an alternative embodiment with a serial bus system, and c) a schematic view of an embodiment with delay elements.

As is shown schematically in FIG. 5a, the actuation function $A(\Delta L_i)$ is generated by means of a function generator 11, stored in the storage 10 and translated into control signals by the detector control 9. The measurements of the object points $i_{mn}$ are triggered at the trigger times generated by the actuation function $A(\Delta L_i)$ along measurement line 5 by means of the detector control 9 which is connected to the detector 8.

In another embodiment of the invention, deviations from the standard parameters (e.g., flight speed, flight altitude, etc.) caused by a drive unit 13 are sent to the function generator 11 and enter into the actuation function $A(\Delta L_i)$.

The detector control 9 triggers time-offset measurements of the object points $i_{mn}$ of an object matrix $O_{mn}$ when the recording fields 6 reach predetermined points $P_i$ of the predetermined measurement line 5 and can be read out from one of the seven detector elements 8a to 8g. The acquired measured values of the object points $i_{mn}$ are then stored in the storage 10 and are accessible therein for further evaluations (e.g., co-registration) and for forwarding to another data processing unit (not shown).

In an embodiment of the apparatus according to the invention according to FIG. 5a, the detector 8 comprises three line detectors 8.1 to 8.3, namely, a first, a second and a third line detector, each of which is outfitted with seven detector elements 8a to 8g (array) for the sake of simplifying the illustration. The line detectors 8.1 to 8.3 are arranged parallel to the path of the rows m of the object matrix $O_{mn}$ in the second scanning direction SR2 and orthogonal to the first scanning direction SR1. A measurement line 5 is associated with each line detector 8.1 to 8.3. Each detector element 8a to 8g is connected by its own signal line 12 to the detector control 9 (shown only for the first line detector 8.1) which in turn communicates via a storage 10 with the function generator 11 and the drive unit 13. Without limiting generality, the drive unit 13 in this instance is an aircraft whose flight movement relative to the Earth's surface causes a movement along the first scanning direction SR1 between measurement line 5 and object matrix $O_{mn}$. However, the drive unit 13 can also be a satellite, a spacecraft, an unmanned flying object, or a scanner. Naturally, radiometric measurements can be carried out not only on Earth, but also on the surfaces of all other astronomical bodies.

It is also possible, as is shown in FIG. 4, that detector elements 8a to 8g of the kind mentioned above which are triggered in common based on slight relative positional deviations $\Delta L_i$ and which are closely adjacent have shared signal lines 12, respectively, by which a group 7 of object points $i_{mn}$ can be measured in each instance.

The arrangement of the detector elements in relation to the first scanning direction SR1 and second scanning direction SR2 can also be carried out differently, e.g., obliquely, angled, or curved, in other embodiments of the invention.

Figure 5B:
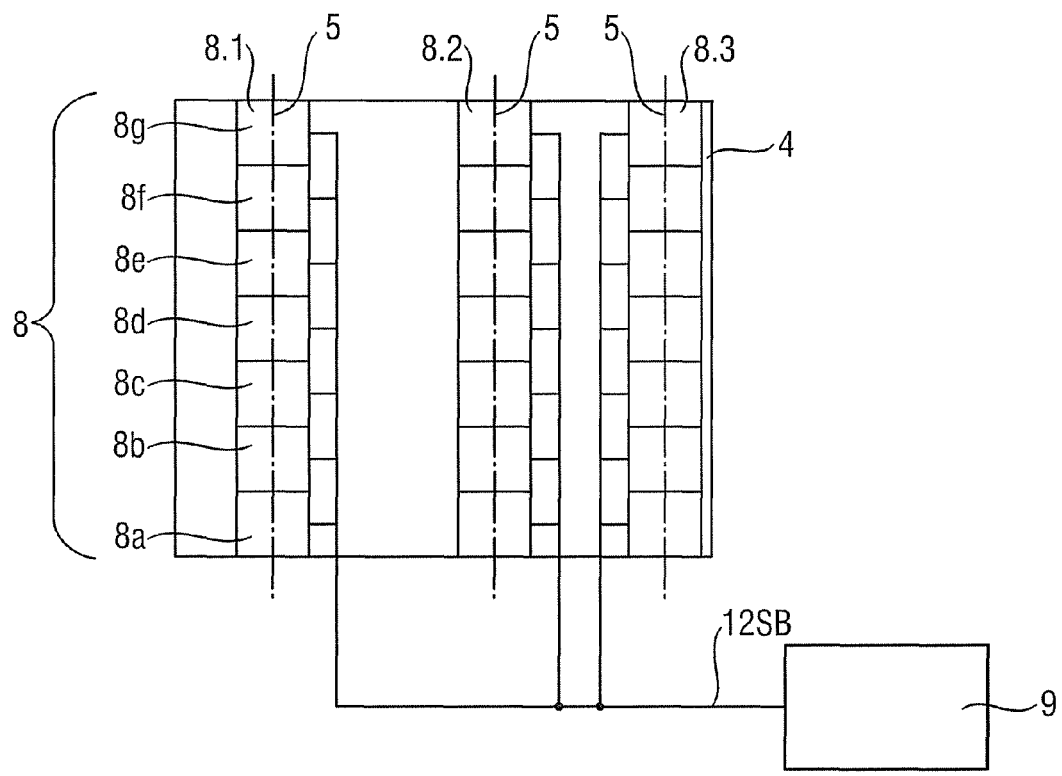

In another embodiment of the apparatus according to FIG. 5b, the individual detector elements 8a to 8g are constructed so as to be individually addressable and are connected to the detector control 9 via a shared signal bus 12SB. The individual detector elements 8a to 8g of the line detectors 8.1 to 8.3 can be triggered individually and independently from one another or in common in groups by means of addressed signals. Further, a time delay can be assigned via a signal bus 12SB to every detector element 8a to 8g or to every group of detector elements 8a to 8g corresponding to the actuation function $A(\Delta L_i)$, a respective trigger time being shifted in relation to a shared trigger signal (control signal) corresponding to this time delay.

Figure 5C:
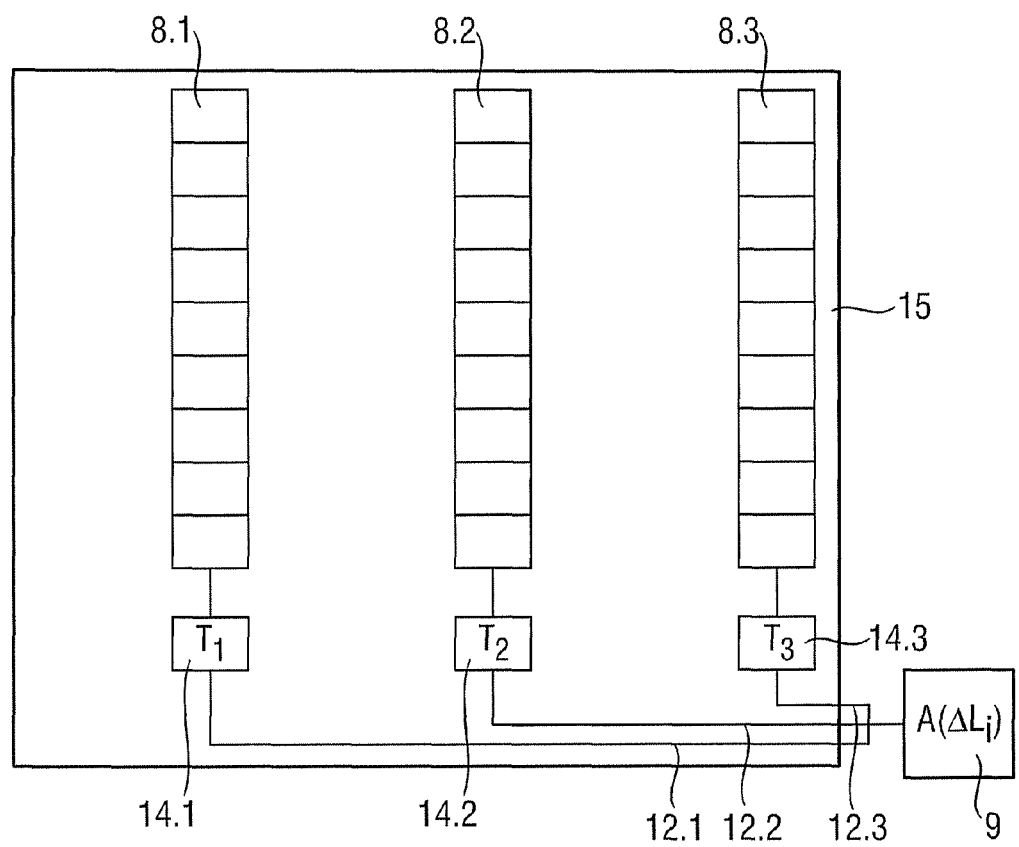

To actuate the detector elements 8a to 8g of the line detectors 8.1 to 8.3, every line detector 8.1 to 8.3 is arranged on a chip 15 (integrated circuit) in another embodiment of the apparatus, as is shown in FIG. 5c, and is connected to the detector control 9 in each instance by a delay element 14.1 to 14.3 and by a signal line 12.1 to 12.3. Each delay element 14.1 to 14.3 causes a delay T1 to T3 of the control signals sent from the detector control 9 to the individual line detectors 8.1 to 8.3, which delay T1 to T3 is specific to and programmable for the line detectors 8.1 to 8.3. Therefore, a control signal which is sent from the detector control 9 to all line detectors 8.1 to 8.3 simultaneously is delayed depending on the actuation function $A(\Delta L_i)$, and the line detectors 8.1 to 8.3 are triggered individually, respectively, at a defined trigger time. All of the detector elements 8a to 8g of a line detector 8.1 to 8.3 are triggered simultaneously with the programmable delay T1 to T3.

In other constructions, delay elements 14.1 to 14.3 can be provided in front of every detector element 8a to 8g of the line detectors 8.1 to 8.3 or only on signal lines 12 and 12.1 to 12.3 of individual line detectors 8.1 to 8.3 and/or detector elements 8a to 8g. Further, delay elements can also be logically assigned to groups 7 of object points $i_{mn}$. The detector control 9 can likewise be arranged on the chip 15. Also, individual delay elements 14.1 to 14.3 or all of the delay elements 14.1 to 14.3 can be arranged outside the chip 15.

The recording field 6 (solid circle) assigned to the image point $B_{m7}$ (not shown for the sake of clarity) of the object point $i_{m7}$ will be considered during its passage through the imaging plane 4 in direction of the first scanning direction SR1 in order to explain the taking of measurements with the embodiment of the apparatus according to FIG. 5a.

Specific actuation functions $A(\Delta L_i)$ are generated according to the steps described above for the respective line detectors 8.1 to 8.3 and are stored in the storage 10 in repeatedly retrievable form. Because of systematic recording errors, the recording field 6 leads the linear measurement line 5 of the first line detector 8.1, i.e., it has a relative positional deviation $\Delta L_i$ having a positive sign. Therefore, the measurement line 5 of object point $i_{m7}$ is triggered by the detector control 9 at a trigger time preceding time $t_0$ of measurement line 5 of the first line detector 8.1 when the recording field 6 coincides prematurely with measurement line 5 of the first line detector 8.1.

No systematic recording errors were determined along measurement line 5 of the second line detector 8.2. Therefore, the measurement is triggered at a trigger time that is identical to time $t_0$ of the measurement line 5 of the second line detector 8.2. Every detector element 8a to 8g of the second line detector 8.2 is actuated individually by the detector control 9 and the respective signal line 12.1 to 12.3, but the measurements are triggered simultaneously.

In the measurement line 5 of the third line detector 8.3, the recording field 6 lags behind the measurement line 5 of the third line detector 8.3 due to systematic recording errors and has a relative positional deviation $\Delta L_i$ having a negative sign. Therefore, the measuring of object point $i_{m7}$ is initiated by the detector control 9 at a trigger time which occurs at a later time than time $t_0$ of measurement line 5 of the third line detector 8.3 and at which the image point $B_{m7}$ is belatedly superposed on the measurement line 5 of the third line detector 8.3. The detector elements 8a to 8g of the third line detector 8.3 are also actuated individually by the detector control 9 and the respective signal line 12.1 to 12.3 and the measurement is triggered.

The image point $B_{m7}$ of object point $i_{m7}$ is recorded once in each instance (co-registered) by each of the line detectors 8.1 to 8.3 so that there is a total of three measurements of the object point $i_{m7}$ which are stored in the storage 10 and made accessible for further evaluation. Naturally, this illustration of the method step presented by way of example applies to all image points $B_{mn}$.

In other embodiments of the apparatus according to the invention, a different quantity of line detectors can be provided. The line detectors 8.1 to 8.3 can also be part of a detector matrix. In further embodiment examples, the line detectors 8.1 to 8.3 can also be aligned in direction of the first scanning direction SR1. The measurement line 5 can then also extend parallel to the rows m of object matrix $O_{mn}$, but the measurements along the measurement line 5 would then be carried out by detector elements 8a to 8g which belong to different line detectors 8.1 to 8.3.

The line detectors 8.1 to 8.3 can be sensitive to radiation of spectral regions that differ from one another so that, particularly during co-registration, the individual radiometric measurements of object points $i_{mn}$ and/or rows m of the object matrix $O_{mn}$ can be carried out in different spectral regions.

In an embodiment of the invention having a detector constructed as a rotating scanner, the method according to the invention and the apparatuses according to the invention can compensate for recording errors which occur in spite of a constant rate of rotation of the scanner due to a position of half-angle mirrors of the scanner outside of an axis of rotation of the scanner.

Further, recording errors perpendicular to the scanning direction can be compensated when using line detectors or arrays of detectors.

The method according to the invention and the apparatuses according to the invention can be used in all applications of optically imaging systems in which an accurate point-by-point measurement is required. In particular, the invention is suitable for applications in the fields of airborne remote sensing and meteorology.

REFERENCE NUMERALS

1 object
2 object scene
3 optics
4 image plane
5 measurement line
6 recording field
7a, 7a' groups
7b, 7b' groups
7c group
8 detector
8.1 first line detector
8.2 second line detector
8.3 third line detector
8a to 8g detector elements
9 detector control
10 storage
11 function generator
12 signal lines
12.1 to 12.3 signal lines
12SB signal bus
13 drive unit
14.1 to 14.3 delay element
15 chip
SR1 first scanning direction
SR2 second scanning direction
$O_{mn}$ object matrix
m rows
n columns
$i_{mn}$ object point
$B_{mn}$ image point
$\Delta L_i$ relative positional deviation
$F(\Delta L_i)$ error function
$A(\Delta L_i)$ actuation function
T1 to T3 programmable delay
$P_i$ point
$\Delta t$ time difference
$t_0$ time
$v(t)$ movement speed
$\bar{v}(t)$ mean movement speed

What is claimed is:

1. A method for air-borne or space-borne corrected radiometric measurement of object points $i_{mn}$ present in an object scene on a surface of an astronomical body which are assigned to rows m and columns n of an object matrix $O_{mn}$ during a scanning progressing systematically in a first scanning direction and a second scanning direction, comprising the steps of:

imaging the object points $i_{mn}$ in an image plane on a detector as image points $B_{mn}$;

recording the image points $B_{mn}$ inside the image plane by at least one radiation-sensitive detector element of the detector, wherein a recording field is acquired by the detector element at every recording time;

determining, prior to the start of a measuring process, recording errors of the detector caused by systematically occurring spatial and temporal changes in a scanning movement of the detector, with reference to points $P_i$ of a designated measurement line along which the image points $B_{mn}$ are recorded, as relative positional deviations $\Delta L_i$ of the recording field from the points $P_i$ of the measurement line;

generating an actuation function $A(\Delta L_i)$ based on the relative positional deviations $\Delta L_i$ along the measurement line in the form of trigger times in which measurements of the individual object points $i_{mn}$ are initiated at different times, wherein the trigger times are so defined along the measurement line that the measurement of every object point $i_{mn}$ is carried out when its image point $B_{mn}$ corresponds spatially to the recording field of one detector element associated with the measurement line;

storing the actuation function $A(\Delta L_i)$ and making it accessible to a detector control unit associated with the detector for successive measurements along the measurement line; and carrying out synchronized measurements of all of the object points $i_{mn}$ of every row of the object matrix $O_{mn}$ along the designated measurement line based on the triggering of detector elements due to the actuation function $A(\Delta L_i)$.

2. The method according to claim 1, wherein systemic imaging errors of the detector are also taken into account by the actuation function $A(\Delta L_i)$ in addition to the systematically occurring spatial and temporal changes in a scanning movement of the detector.

3. The method according to claim 1, wherein groups of selected image points $B_{mn}$ are formed whose respective recording fields have relative positional deviations $\Delta L_i$ which are less than a predetermined threshold value, and measurements of the object points $i_{mn}$ of a group are triggered simultaneously.

4. The method according to claim 1, wherein measurements for the same object points $i_{mn}$ are triggered a plurality of times successively in time for different measurement lines.

5. The method according to claim 4, wherein spontaneously occurring contributions to the relative positional deviations $\Delta L_i$ are acquired and are taken into account when generating the actuation function $A(\Delta L_i)$.

6. Use of the method according to claim 1 by an integrated circuit, wherein each detector element of the detector is connected to a detector control unit by a signal line, respectively, and each detector element can be triggered individually.

7. Use of the method according to claim 1 by an integrated circuit, wherein groups of detector elements of the detector are connected, respectively, to a detector control unit via a signal line, respectively, so that measurements of a plurality of object points $i_{mn}$ can be triggered simultaneously within the groups.

8. Use of the method according to claim 6, wherein at least one delay element is arranged in at least one signal line in order to retard a control signal sent from the detector control unit depending on the actuation function $A(\Delta L_i)$.

9. Use of the method according to claim 7, wherein at least one delay element is arranged in at least one signal line in order to retard a control signal sent from the detector control unit depending on the actuation function $A(\Delta L_i)$.

10. An apparatus for air-borne or space-borne corrected radiometric measurement of object points $i_{mn}$ present in an object scene on a surface of an astronomical body which are assigned to rows m and columns n of an object matrix $O_{mn}$ during a systematically progressing scanning, comprising:
   an optics by which the object points $i_{mn}$ are imaged into an image plane;
   a detector arranged in the image plane of the optics having at least one radiation-sensitive detector element for generating a systematically progressing imaging of the object matrix $O_{mn}$ in image points $B_{mn}$, wherein intensities of the imaged object points $i_{mn}$ can be recorded as the image points $B_{mn}$ inside the image plane by the detector and a recording field is acquired by the detector element at every recording time;
   a storage being provided for storing an actuation function $A(\Delta L_i)$, wherein the actuation function $A(\Delta L_i)$ is generated based on recording errors caused by systematically occurring spatial and temporal changes in a scanning movement of the detector and the recording errors are determined as relative positional deviations $\Delta L_i$ of the recording field with respect to a designated measurement line;
   a detector control unit being connected to the storage in order to generate control signals for the detector at trigger times from the stored actuation function $A(\Delta L_i)$ in the detector control, wherein the trigger times along the measurement line are defined in such a way that measurement of every object point $i_{mn}$ is carried out when the image point $B_{mn}$ thereof in the image plane spatially corresponds to the recording field of one detector element associated with the measurement line, and to the detector control unit being further connected to the detector in order to actuate each detector element for the recording of a respective image point $B_{mn}$ at the correspondingly defined trigger time.

11. The apparatus according to claim 10, wherein each detector element of the detector is connected to the detector control unit by a separate signal line so that each detector element can be triggered individually.

12. The apparatus according to claim 10, wherein groups of detector elements of the detector are connected, respectively, to the detector control unit via a signal line, respectively, so that the measurement of a plurality of object points $i_{mn}$ can be triggered simultaneously within the groups and individually for each group.

13. The apparatus according to claim 10, wherein the detector elements are connected to the detector control unit via signal lines and at least one delay element is arranged on at least one signal line to retard a control signal sent from the detector control unit depending on the actuation function $A(\Delta L_i)$.

14. The apparatus according to claim 13, wherein the at least one delay element can be adjusted for a determined delay.

15. The apparatus according to claim 10, wherein the detector is connected to the detector control unit via a signal bus and has addressable detector elements which can be triggered individually or in groups by means of addressed signals.

16. The apparatus according to claim 10, wherein lenses and beam-deflecting elements of the optics are constructed as magnetic lenses and electrostatic beam-deflecting elements, and the detector is suitable for detection of particle radiation.

\* \* \* \* \*